US006986427B2

(12) United States Patent
Aune et al.

(10) Patent No.: US 6,986,427 B2
(45) Date of Patent: *Jan. 17, 2006

(54) THREE-DIMENSIONAL NON-WOVEN MEDIA

(75) Inventors: Thomas M. Aune, Mound, MN (US); Clinton V. Kopp, Bismarck, ND (US); Michael J. Madsen, Eden Prairie, MN (US); Philip M. Rolchigo, Bedminster, NJ (US); Travis G. Stifter, Brooklyn Park, MN (US)

(73) Assignee: GE Osmonics, Inc., Minnetonka, MN (US)

( * ) Notice: Subject to any disclaimer, the term of this patent is extended or adjusted under 35 U.S.C. 154(b) by 254 days.

This patent is subject to a terminal disclaimer.

(21) Appl. No.: 10/278,247

(22) Filed: Oct. 23, 2002

(65) Prior Publication Data

US 2003/0080051 A1   May 1, 2003

Related U.S. Application Data

(60) Provisional application No. 60/343,827, filed on Oct. 23, 2001.

(51) Int. Cl.
*B01D 39/02* (2006.01)

(52) U.S. Cl. .................. 210/488; 55/527; 210/497.01; 210/505; 428/98; 428/212; 428/221

(58) Field of Classification Search ................ 210/488, 210/496, 497.01, 502.1, 503, 505, 506; 156/167, 156/173, 171; 55/527; 428/98, 212, 221, 428/222

See application file for complete search history.

(56) References Cited

U.S. PATENT DOCUMENTS

| 3,073,735 A | 1/1963 | Till et al. ...................... 156/38 |
| 3,251,475 A | 5/1966 | Till et al. .................... 210/508 |
| 3,261,473 A | 7/1966 | Riede .......................... 210/282 |
| 3,347,391 A | 10/1967 | Steensen ..................... 210/491 |
| 3,595,245 A | 7/1971 | Buntin |
| 3,801,400 A | 4/1974 | Vogt et al. .................. 156/167 |
| 3,825,379 A | 7/1974 | Lohkamp et al. ............. 425/72 |
| 3,825,380 A | 7/1974 | Harding et al. .............. 425/72 |
| 3,904,798 A | 9/1975 | Vogt et al. ..................... 428/36 |
| 3,933,557 A | 1/1976 | Pall ............................ 156/167 |
| 4,021,281 A | 5/1977 | Pall ............................ 156/167 |
| 4,112,159 A | 9/1978 | Pall .............................. 428/36 |
| 4,116,738 A | 9/1978 | Pall ............................ 156/167 |
| 4,173,443 A | 11/1979 | Lin .............................. 425/66 |
| 4,225,642 A | 9/1980 | Hirakawa .................... 428/91 |
| 4,240,864 A * | 12/1980 | Lin ............................. 156/441 |
| 4,594,202 A | 6/1986 | Pall et al. ...................... 264/8 |
| 4,714,647 A | 12/1987 | Shipp, Jr. et al. ........... 428/212 |
| 4,726,901 A | 2/1988 | Pall et al. ................... 210/496 |

(Continued)

*Primary Examiner*—Joseph Drodge
(74) *Attorney, Agent, or Firm*—Kinney & Lange, P.A.

(57) ABSTRACT

A non-woven melt-blown filament medium includes a mass of essentially continuous melt-blown polymer filaments and an essentially continuous traversing melt-blown polymer filament extending through the mass. The mass has a depth dimension, a longitudinal dimension, and a latitudinal dimension. The mass includes a plurality of layers, each of the plurality of layers being generally oriented in the longitudinal and latitudinal dimensions. The traversing filament is generally oriented in the depth dimension and extends through at least one layer of the mass. In one embodiment, the mass is cylindrical in shape and the layers comprise concentric zones. The traversing filament is intentionally deposited and positioned to improve the physical properties of the mass.

55 Claims, 7 Drawing Sheets

U.S. PATENT DOCUMENTS

| | | |
|---|---|---|
| 4,759,782 A | 7/1988 | Miller et al. .................. 55/487 |
| 4,861,633 A | 8/1989 | Abe .......................... 428/36.3 |
| 5,288,402 A | 2/1994 | Yoshida ...................... 210/488 |
| 5,340,479 A * | 8/1994 | Szczepanski et al. .... 210/497.1 |
| 5,360,545 A | 11/1994 | Pall et al. .................. 210/505 |
| 5,366,576 A * | 11/1994 | Clack ......................... 156/173 |
| 5,409,642 A | 4/1995 | Allen et al. ................... 264/6 |
| 5,523,033 A | 6/1996 | Shambaugh ................... 264/6 |
| 5,591,335 A | 1/1997 | Barboza et al. .......... 210/323.2 |
| 5,681,469 A | 10/1997 | Barboza et al. ............. 210/503 |
| 5,733,581 A | 3/1998 | Barboza et al. ............. 425/72.2 |
| 5,783,011 A * | 7/1998 | Barboza et al. ............. 156/167 |
| 5,980,759 A * | 11/1999 | Proulx et al. ............... 210/767 |
| 6,358,417 B1 * | 3/2002 | Aune et al. ............ 210/497.01 |

\* cited by examiner ously urged off the the noncy

THREE-DIMENSIONAL NON-WOVEN MEDIA

CROSS-REFERENCE TO RELATED APPLICATION(S)

This application claims priority from U.S. Provisional Patent Application Ser. No. 60/343,827, filed Oct. 23, 2001, for "Three-Dimensional Non-Woven Media," by Thomas M. Aune, Clinton V. Kopp, Michael J. Madsen, Philip M. Rolchigo, and Travis G. Stifter. Reference is made to U.S. patent application Ser. No. 09/296,070, now U.S. Pat. No. 6,358,417, filed on Apr. 21, 1999, for "Non-Woven Depth Filter Element", U.S. Provisional Patent Application Ser. No. 10/278,322, filed Oct. 23, 2002, for "Three-Dimensional Non-Woven Filter", and U.S. patent application Ser. No. 10/279,043, filed Oct. 23, 2002, for "Process For Making Three-Dimensional Non-Woven Media".

BACKGROUND OF THE INVENTION

The present invention relates generally to the field of melt-blown media, more specifically media that has reduced density while maintaining structural strength. Such media can provide beneficial application in many uses where desirable material properties include low density and high void volume while maintaining a relatively rigid structure, especially under pressure. Uses for such media include filtration media for various applications such as particle filtration, coalescing of oils and leukocyte filtration. Other uses envisioned include insulation, impact absorbing protective and conformable material, and wicking media for evaporators.

Numerous apparatuses and processes for forming melt blown media comprised of a plurality of substantially continuous filaments currently exist in the prior art. In this art, fiber forming devices or fiberizers such as those described in U.S. Pat. No. 3,825,379 issued to Lohkamp et al. and U.S. Pat. No. 3,825,380 issued to Harding et al. are used to spray filaments of synthetic resinous material toward a collection device. During this process, jets of air or other gases act on the filaments to attenuate such filaments to a comparatively fine diameter and convey the same to the collection device. Fibers continue to build up on the collection device until a mass of fibers of the desired size and morphology is achieved.

Several specific processes have evolved from this general concept. One of these processes is described in U.S. Pat. No. 3,849,241 issued to Buntin et al. It discloses a process die or fiberizer consisting of a die head containing separate passages for the filament material and the attenuating air. During operation, molten resinous material is forced through one or more small holes or nozzles in the die head toward a collection device and is attenuated by air streams positioned on the sides of the material outlet holes. The collection method utilized with this process includes a rotating drum to form a continuous mat. Another of these processes is described in U.S. Pat. No. 4,021,281, issued to Pall. It describes the continuous formation of a melt blown media web onto a rotating drum, being deposited in the form of a tubular web that can be slit into flat media. Another process is exemplified by U.S. Pat. No. 4,240,864 issued to Lin et al. This patent discloses a process die or nozzle block which delivers a plurality of filaments toward a rotating collection device. Associated with the filaments are attenuating air streams which function to attenuate the filaments as they travel toward the collection device. Lin et al. also disclose a press roll for varying the pressure applied to the accumulating fibers on the rotating mandrel so as to provide a filter of varying fiber density. Like the processes of Buntin et al. and Pall, the diameter of the individual filaments in the Lin et al. process is constant throughout the entirety of the media. However, contrary to Buntin et al. and Pall, in the Lin et al. process, the resultant media are continuously urged off the rotating mandrel via the noncylindrical press roll to produce a coreless depth filter element.

Another specific process is represented by U.S. Pat. Nos. 4,594,202 and 4,726,901, both issued to Pall et al. Similar to the processes described above, the Pall process includes a fiberizer or fiberizer die having a plurality of individual nozzles through which the molten filament resin is forced toward a collection mandrel. Also similar to the other processes described above, this process discloses the use of air or gas streams for the purpose of attenuating the filaments as they travel toward the collection mandrel. This process differs from the processes described above, however, in that it discloses a means for varying the fiber diameter throughout the radial dimension of the filter element, while maintaining a substantially constant voids volume for each level of fiber diameter variance. Pall et al. accomplish this by sequentially altering certain parameters which affect the fiber diameter during collection of the filaments on the rotating mandrel.

Although each of the above specific processes is generally acceptable for certain applications, each also has certain limitations. For example, one limitation of the Pall et al. (U.S. Pat. Nos. 4,594,202 and 4,726,901) process is that it is a non-continuous or semi-continuous process. In other words, a filter element of finite length is formed by building up a mat of attenuated filaments on a rotating mandrel. When the collected filament material reaches a desired thickness, the filter structure is removed and the process is commenced again for the next filter element.

Although the Pall et al. patents (U.S. Pat. Nos. 4,594,202 and 4,726,901) contemplate a depth filter element comprised of filaments with varying diameters, there are several limitations which exist. First, the process of Pall et al. is not a continuous process, but must be repeated for each filter manufactured. Second, although some filter elements of Pall et al. have filaments of varying diameters, the process of making such elements has limitations. Specifically, the filament diameter is varied by sequentially changing one of several operating conditions of the filament producing mechanism. Whenever such a change is introduced, however, the system takes time to respond to such changes before again reaching equilibrium. The time frame for response is proportional to the degree of change. Because these changes are introduced during the manufacture of each individual filter element, a less stable and more variable process results. Further, the changeover from a filament of one diameter to that of another occurs gradually as a time related transition, rather than abruptly such as where the structure is comprised of two or more discrete filaments.

An important attribute of the media structure is the percent void volume which is the ratio of the air volume in the structure to the total media structure volume. The percent voids volume in the melt-blown media should be as high as possible in order to achieve a number of desirable characteristics in filtration applications, such as high dirt holding capacity and lower initial pressure drop. Generally, achieving a high void volume results in lowering the density of the media mass. It is also desirable to lower the density of a media mass, because a lower density media requires less material usage, allowing for lower material costs, higher throughput, and faster production.

Another advantage of media with high void volume is that they are amenable to insertion of a significant percentage volume of active particles or fibers without inducing an unacceptable increase in pressure drop in filtration applications. For example, activated carbon particles may be dispersed in the media as they are formed. Moreover, masses with high void volumes and lower densities also generally provide advantages for other applications such as thermal insulation, evaporative wicking and impact absorption material.

However, in prior art melt blown media, there is an upper limit beyond which further increasing the percent voids volume becomes undesirable. Attempts to produce low density, high void volume, media structures using the prior art teachings result in reduced fiber-to-fiber bonding and typically insufficient structural strength. As the voids volume is increased in prior art structures, the fibrous media used in a depth filter are more readily compressed by the pressure drop generated by the fluid passing through it. This is particularly troublesome when the fluid is viscous. If the percent void volume is too high, the filter medium will begin to collapse at too low a differential pressure. As it collapses, the pores become smaller and the differential pressure increases, causing still more compression. The resulting rapid increase in pressure drop thus reduces the media's useful life and dirt holding capacity rather than—as might otherwise be expected with the increased void volume media—extending it. Use of a very low density (high voids volume) can also make the filter very soft and thereby more readily damaged in normal handling and more likely to compress and collapse in use.

A drawback of the prior art products is that the low density filters often are made using fine fibers and therefore have a fine micron rating, which is inherent to the finer fiber matrix. It would be desirable to use fine fibers to achieve low density, while maintaining the capacity to produce media with a larger pore structure. For a filtration application, this would mean a coarser micron rating, thereby allowing for filtration of a wider range of particles without premature clogging of the filter. This would require that the fine fiber network is somehow fixed in a more open structure, thereby avoiding the natural packing tendency of the fine fibers that inherently create a finer pore structure.

Although prior art methods exist for manufacturing melt blown media, each of the methods, as well as the products constructed from such methods, have limitations of compressive strength at low media densities. Accordingly, there is a need in the art for an improved, cost efficient melt blown media. A need also exists for a continuous method and apparatus for producing such media.

BRIEF SUMMARY OF THE INVENTION

A non-woven melt-blown filament medium includes a mass of essentially continuous melt-blown polymer filaments and an essentially continuous traversing melt-blown polymer filament extending through the mass. The mass has a depth dimension, a longitudinal dimension, and a latitudinal dimension. The mass includes a plurality of layers, each of the plurality of layers being generally oriented in the longitudinal and latitudinal dimensions. The traversing filament is generally oriented in the depth dimension and extends through one or more layers of the mass. In one embodiment, the mass is cylindrical in shape and the layers comprise concentric zones. In one embodiment, a core zone of the mass has filaments having a diameter; an intermediate zone of the mass has filaments having larger diameters than the filaments of the core zone; and an outer zone of the mass has filaments having larger diameters than the filaments of the intermediate zone. In one embodiment, the traversing fiber is a bonding fiber bonding one or more layers of the mass together.

DETAILED DESCRIPTION OF THE PREFERRED EMBODIMENTS

Figure 1:
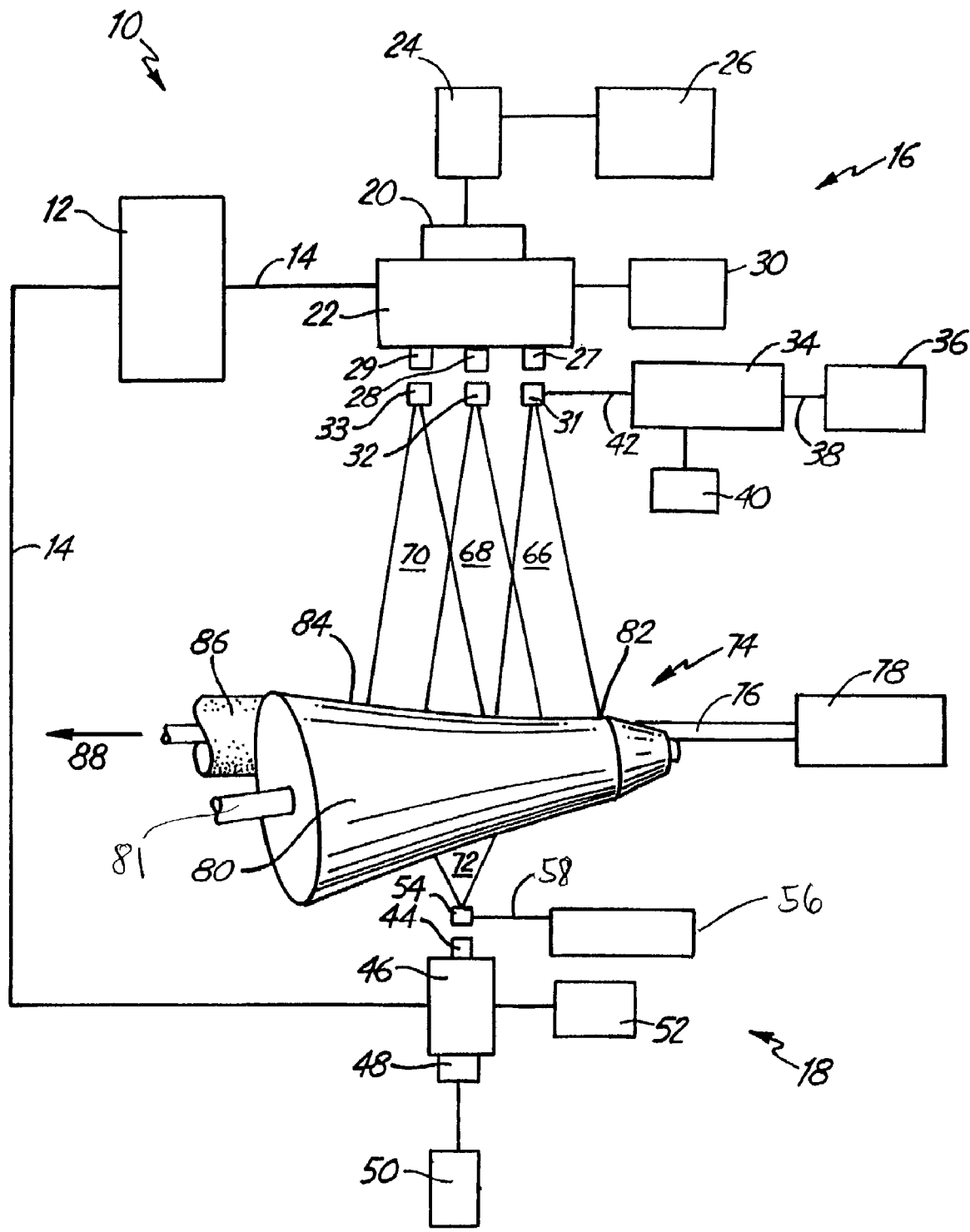
FIG. 1 is a schematic diagram generally illustrating a system for continuously producing a non-woven depth filter element.

The present invention of melt blown media with improved structural strength can be used in various formats for melt blown media including continuously formed cartridge filters, continuously formed webs, structural composite webs, and pre-impregnated fiber reinforcing mats. The melt blown media of the present invention comprise a mass of essentially continuous polymer filaments. The media have a length or longitudinal dimension, a width or latitudinal dimension, and a depth dimension. The primary filaments of the melt blown media are generally oriented in the length (x or longitudinal) and width (y or latitudinal or circumferential in the case of a cylindrical mass) dimensions. An important feature of the invention is that the media also comprise essentially continuous polymer filaments extending in the depth (z) dimension. The concurrent formation of primary fibers in the x and y dimensions and separate bonding fibers in the z dimension allows for design and engineering of specific zones of media for specific application needs. The invention also includes a method of continuously producing the melt blown media.

One important embodiment of the melt blown media comprises a cylindrical mass of essentially continuous polymer filaments. The cylindrical mass has a longitudinal or x dimension, a circumferential or y dimension and a radial or z dimension. The primary filaments of the cylindrical mass are generally oriented in the longitudinal and circumferential or x and y dimensions. The filament mass also comprises essentially continuous polymer filaments extending throughout the cylindrical mass in the radial or z dimension. These melt blown media are particularly useful for producing a filament mass to use in constructing a depth filter element. In a tubular filter, for example, the media of the present invention allow for the formation of a self supporting interior core zone that concurrently provides a zone of critical filtration. By placing a higher percentage of the bonding filaments in the core zone and those zones next to the core, the filter can be engineered to have both higher crush strengths and lower density than if the same amount of bonding filaments were evenly distributed throughout the media. The invention also includes a method of continuously producing the filament mass.

One useful demonstrated application for the invention is for particle filtration and more particularly for use in a depth filter cartridge comprising a filter element constructed of a plurality of substantially continuous filaments which are collected to form a generally tubular depth filter cartridge. The present invention also relates to a method and system for making such a filter cartridge.

To obtain the unique, combined benefit of a low density and rigidly fixed media structure requires implementation of two or more concurrently formed melt blown media. A very fine matrix of primary fibers with reduced fiber to fiber bonding is used to form a structure with low density. A second source of filaments is concurrently and intentionally placed in the z dimension onto the primary media as they are forming to provide improved fiber to fiber bonding as well as interlocking the mechanical structure. These z filaments thereby form a more rigid porous structure which has significantly greater mechanical strength. The primary media are typically formed in essentially two-dimensional layers with the fibers oriented in the x and y axes and with only incidental bonding between layers. It has been discovered that it is beneficial to place the bonding z filaments in the forming layers of primary media fibers and across two or more of the formed primary media layers, with these bonding z filaments essentially oriented in the z-axis with respect to the primary media. This permits concurrent, continuous production of very fine melt-blown media that are relatively rigid and wherein the fibers are structurally locked in place.

It has also been found beneficial to insert the bonding z filaments across the primary media as they are forming, so the bonding z filaments extend across one or more zones of the primary media. It has also been found beneficial for the bonding z filaments to extend across all the layers of the primary media, and thereby to traverse from one major surface of the finished primary media to the other major surface. In a described embodiment of this invention, the z filament is used as a bonding filament to produce low density primary media that have improved resistance to compression. It is envisioned that the insertion of the bonding z filament across one or more layers of the primary media as they are forming could be used to produce media with other significant benefits. For example, the z polymer could have significantly different physical or chemical characteristics which could result in a significant improvement in the composite media produced. The ability to engineer the placement, composition and physical attributes of these z filaments is very useful and offers the opportunities to explore media structures not possible in the current art.

Another aspect of the present invention is the application of a thin layer of bonding fibers at one or both surfaces of the forming media to provide a more finished porous surface. The bonding fibers adhere to the primary media fibers at the surface and thereby eliminate loose fibers at the media surface. Another significant benefit discovered is that the bonding fibers adhere to the primary surface fibers and conform to the texture of the surface. The bonding fibers then shrink as they cool, which intensifies the resulting surface roughness. The resulting finished surface was surprisingly found to have about twice the surface area of an unfinished primary media surface. This increased surface area provides a number of benefits, especially useful for particle filtration applications. Doubling the surface area of the shell can allow the shell to have a lower porosity while not causing an excessive pressure drop. Also, as the filter is used, a cake of particles can collect on the shell surface and also cause increased pressure drop. The high surface area permits extended operation before such pressure drop increases are incurred. Also, in a cartridge filter embodiment, the formation of a relatively hard shell avoids the necessity to encapsulate the filter in a support cage after the filter cartridge is produced.

A preferred embodiment of the present invention is an improved non-woven filament mass for use in constructing a depth filter element as well as a system and a method for continuously making such a mass. However, it should be understood that other embodiments are also contemplated. For example, while a cylindrical product is described in the preferred embodiment, the teachings of the invention may be adapted for flat, sheet, or planar products. Such a flat product may be produced, for example, by manufacturing the medium on a large drum and then cutting the resulting cylindrical medium along its length to obtain a sheet of material.

FIG. 1 generally illustrates one embodiment of a system which is used to continuously manufacture filament mass of indefinite length. The mass can then be cut into a plurality of individual filament elements of desired length. A similar system is disclosed in U.S. Pat. No. 5,340,479 by Szczepanski, et al., which is fully incorporated herein by reference. The illustrated embodiment of system 10 includes motor driven screw type extruder 12 which is supplied with thermoplastic polymeric material from a source (not shown). The particular thermoplastic polymeric material may be any one of a variety of synthetic resinous materials which can produce the filaments used in manufacturing the depth filter element of the present invention. Although the class of polymeric materials known as polypropylenes is preferred, polyesters, Nylon, polyurethanes and other materials may be used as well.

Within extruder 12, the polymeric material is heated to a molten state, at which time it is metered and conveyed into heated delivery line 14. The material is maintained or further heated in line 14 and is ultimately directed to a filament forming means, which in one embodiment is in the form of two filament delivery systems 16 and 18. Each of the delivery systems 16 and 18 produces one or more substantially continuous polymeric filaments and directs the same along a predetermined path toward a collection means as will be described in greater detail below.

Filament delivery system 16 includes a motor driven gear type positive displacement metering pump 20 which receives molten polymeric material from heated delivery line 14 and pumps it to heater block 22. The speed of motor 24 which drives metering pump 20, and thus the rate at which the material is metered through pump 20 is electronically controlled by an appropriate controller 26.

Heater block 22, which is independently heated via heating means (not shown) is provided with internal passages which lead to a plurality of nozzles 27, 28, and 29. The heating means, and thus the temperature of the polymeric material within heater block 22, is controlled by temperature control 30. Each nozzle 27, 28, and 29 includes an orifice, the size of which may be selected as desired to assist in achieving a desired filament size or diameter. The molten material fed to each nozzle 27, 28, and 29 exits the respective orifice in a stream.

Associated with each nozzle 27, 28, and 29 are attenuating mechanisms 31, 32, and 33, which comprise a plurality of gas or air jets. Gas flowing out of the attenuating mechanisms 31, 32, and 33 function to attenuate the stream of molten material exiting from nozzles 27, 28, and 29 to form polymeric filaments in a manner known in the art. Attenuating mechanisms 31, 32, and 33 accordingly may be of any design known in the art including that described in U.S. Pat. No. 4,173,443 by Lin, the disclosure of which is incorporated herein by reference.

Attenuating mechanism 31 is associated with an optional gas heater 34 and gas supply source 36. Gas supply source 36 provides gas via conduit 38 and appropriate valves and regulators to heater 34. The temperature of heater 34 is elevated or lowered to the desired temperature via temperature control 40. The gas is then fed from heater 34 through conduit 42 to attenuating mechanism 31. Attenuating mechanisms 31, 32, and 33 may be provided with gas from a common supply source such as described with reference to FIG. 1 or alternatively, separately controlled gas sources may be employed for each attenuating mechanism 31, 32, and 33.

Filament delivery system 18 is substantially similar to that of system 16 described above, except that filament delivery system 18 preferably includes a means of delivering the filaments in such a manner as to actively intermingle with filaments produced by one or more of the nozzles used in system 16. Filament delivery system 18 may include one or more polymer extrusion nozzles. One embodiment uses one nozzle 44 which includes a sweep mechanism for attenuator 54 (shown later with respect to FIG. 2). Specifically, system 18 includes heater block 46, independently driven positive displacement metering pump 48 and motor 50. Heater block 46 is provided with nozzle 44 and temperature control 52. System 18 is also provided with attenuating mechanism 54 associated with nozzle 44. Pressurized gas is passed to attenuating mechanism 54 from gas supply source 56 via conduit 58. As with delivery system 16, each of the attenuators in system 18 can be associated with optional gas heaters, not shown. The provision of separate filament delivery systems 16 and 18 enables separate control and production of polymeric filaments produced by each system 16 and 18.

Delivery systems 16 and 18 produce streams of discrete, essentially continuous polymer filaments which are distributed in flared patterns 66, 68, 70, and 72 and directed from nozzles 27, 28, 29, and 44 and attenuating mechanisms 31, 32, 33, and 54, respectively, toward filament collection device 74. There is preferably some overlap in adjacent filament patterns 66, 68, and 70 so that the filaments of each pattern connect with the filaments of the respective adjacent patterns, resulting in an integrated tubular filament mass. Filament collection device 74 includes central, rotatable collection device 76 such as a mandrel or drum, which extends from drive motor 78. Press roll member 80, which rotates about axle shaft 81, is disposed adjacent to mandrel 76 and spaced therefrom.

During operation, the essentially continuous polymer filaments of streams 66, 68, and 70 are directed in a flared pattern toward rotating mandrel 76 and collected thereon in a manner known in the art. While mandrel 76 is shown, it is contemplated that other collection devices may also be used, such as large diameter drums. Simultaneously, reciprocating or oscillating stream 72 deposits an essentially continuous filament or fiber stream which spans the distance between a far edge 82 of stream 66 and a far edge 84 of stream 70 and traverses the layers of filaments laid down by streams 66, 68, and 70. Rotating press roller 80 engages the filaments which have accumulated on rotating mandrel 76. As sufficient filaments are built up on mandrel 76, press roller 80 forces non-woven filament mass or fiber structure 86 off the axial end of mandrel 76 in the direction of arrow 88 to produce a continuous filament mass 86 of indefinite length. Filament mass 86 has a radial dimension, a longitudinal dimension, and a circumferential dimension. The entire filament collection device 74 may be similar to that described in U.S. Pat. No. 4,240,864 by Lin, the disclosure of which is incorporated herein by reference.

Figure 2:
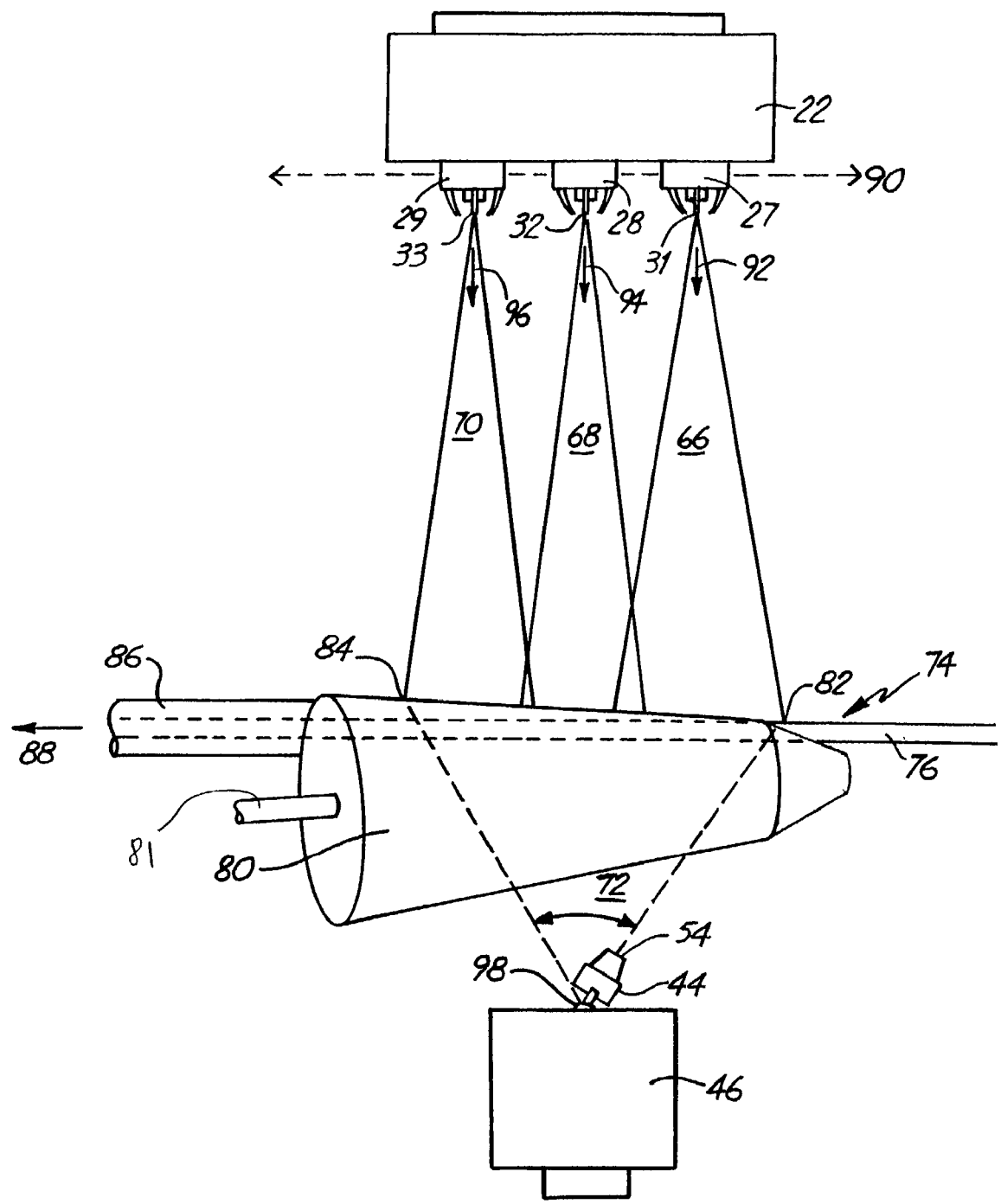
FIG. 2 is a schematic diagram illustrating the system configuration for continuously producing a depth filter element of the present invention.

For a more complete understanding of the present invention, reference is made to FIG. 2, which is a schematic diagram illustrating the apparatus of FIG. 1 configured for continuously producing a depth filter element of the present invention. As shown in FIG. 2, four filament producing devices are employed, each of which comprises a nozzle and an attenuating mechanism, such as nozzles 27, 28, 29, and 44 and attenuating mechanisms 31, 32, 33, and 54. Nozzles 27, 28, and 29 are longitudinally aligned along common axis 90, which is preferably about 0–15 degrees offset from parallel to mandrel 76. In a preferred embodiment, nozzles 27, 28, and 29 are positioned about 4 inches apart. Each nozzle 27, 28, and 29 includes an orifice which defines an axis 92, 94, and 96, respectively, that is preferably perpendicular to axis 90 and about 0–15 degrees offset from perpendicular to mandrel 76. Axes 93, 94, and 96 generally correspond to the flow axis of molten polymer exiting the respective nozzle orifice. In one preferred embodiment, nozzles 27, 28, and 29 are located approximately 35–40 inches from mandrel 76, which preferably spins at a rate of about 400 RPM. This orientation results in flared filament patterns 66, 68, and 70 being directed toward mandrel 76.

Filament patterns 66, 68, and 70 are comprised of polymer filaments having diameters of between less than about 1 micron to about 100 microns. In a preferred embodiment, filament pattern 66 comprises filaments of the smallest diameter; filament pattern 68 comprises filaments of intermediate diameter; and filament pattern 70 comprises filaments of the largest diameter. As a non-limiting example, polymer filaments of filament patterns 66, 68, and 70 were produced in a depth filter by extruding polypropylene heated to a temperature of between about 325° C. and about 400° C. through a nozzle having an orifice size of about 0.016 inch at a rate of about 11 pounds per hour and passing an ambient gas at a temperature of about 25° C. at a rate of about 13 standard cubic feet per minute over the molten polymer stream exiting the nozzle orifice. It will be appreciated that a person skilled in the art can readily determine other suitable parameter combinations. It can be appreciated that the operating parameters may be varied between filament patterns 66, 68, and 70 to produce zones of varying densities and fiber sizes.

Opposite filament patterns 66, 68, and 70, nozzle 44 and attenuating mechanism 54 produce filament pattern 72. As better seen in FIG. 2A, filament pattern 72 comprises pattern 72A which moves in a reciprocating, transverse pattern, preferably covering the distance between the primary pattern edges 82 and 84. Alternatively, filament pattern 72 covers less than the distance between edges 82 and 84. Filament pattern 72 preferably originates from one or more nozzles 44 located in a position above or below press roll 80 so that pattern 72 travels from nozzle 44 to mandrel 76 and lands on the forming filament mass 86 without spraying directly onto press roll 80.

Attenuating mechanism 54 preferably includes servo driven sweep mechanism 98 (see FIG. 2) which allows attenuating mechanism 54 to sweep through an angle so that the filament pattern 72A (see FIG. 2A) traverses back and forth among fiber patterns 66, 68, and 70, along a longitudinal dimension of filament mass 86. As pattern 72A traverses fiber patterns 66, 68, and 70, it deposits essentially continuous polymer filaments across the overall laydown pattern which extends between the primary pattern edges 82 and 84. In formed filament mass 86, the fibers of filament pattern 66 deposited along edge 82 will form a first major surface 97 (shown in FIG. 3), and the fibers of filament pattern 70 deposited along edge 84 will form a second major surface 99 (shown in FIG. 3). In another embodiment, nozzle 44 may be oscillated back and forth to sweep bonding filament pattern 72.

In a preferred embodiment shown in FIG. 2, sweep mechanism 98 comprises a servo drive motor with a cam and follower mechanism. Other suitable devices, such as AC/DC driven mechanical cranks and push rod mechanisms, for example, are also acceptable. In a preferred embodiment, sweep mechanism 98 runs at about 950 oscillations per minute. As depicted, attenuating mechanism 54 of nozzle 44 is oriented to produce gas streams which result in flared filament pattern 72 being directed toward mandrel 76.

In one preferred embodiment, nozzle 44 is located approximately 18–22 inches from mandrel 76. Because nozzle 44 is positioned much closer to mandrel 76 than nozzles 27, 28, and 29, the fibers of filament pattern 72 have less time to cool before contacting filament mass 86 and are therefore hotter and more adhesive than fibers of filament patterns 66, 68, and 70. Preferably, the fiber of filament pattern 72 is still relatively liquid when it contacts the fibers of filament patterns 66, 68, and 70. Because a skin or shell has not completely formed on the fiber of filament pattern 72, it instantaneously adheres to the fibers of filament patterns 66, 68, and 70 upon contact. However, some attenuation or cooling of the fiber of filament pattern 72 is required to avoid melting of the fibers of filament patterns 66, 68, and 70.

In an alternative embodiment, rather than locating nozzle 44 closer to mandrel 76 than nozzles 27, 28, and 29, attenuating mechanism 54 may use less air or warmer air than attenuating mechanisms 31, 32, and 33. This arrangement will also result in fibers of filament pattern 72 being hotter and more adhesive than fibers of filament patterns 66, 68, and 70. Other process alternatives known in the art may be used to deliver fibers of filament pattern 72. For example, it is also envisioned that fibers of pattern 72 could be colder than those of filament patters 66, 68, and 70 so as to lend mechanical advantage rather than thermal bonding, as taught in an embodiment above.

Filament pattern 72 is comprised of polymer filaments having diameters of between less than about 1 micron to about 100 microns. As a non-limiting example, polymer filaments of filament pattern 72 are produced in the depth filter of the instant invention by passing polypropylene heated to a temperature of between about 325° C. and about 400° C. through a nozzle having an orifice size of about 0.016 inch at a rate of about 8 pounds per hour and passing at an ambient gas at a temperature of about 25° C. at a rate of about 7 standard cubic feet per minute over the molten polymer stream exiting the nozzle orifice. It will be appreciated that a person skilled in the art can readily determine other suitable parameter combinations.

Figure 2A:
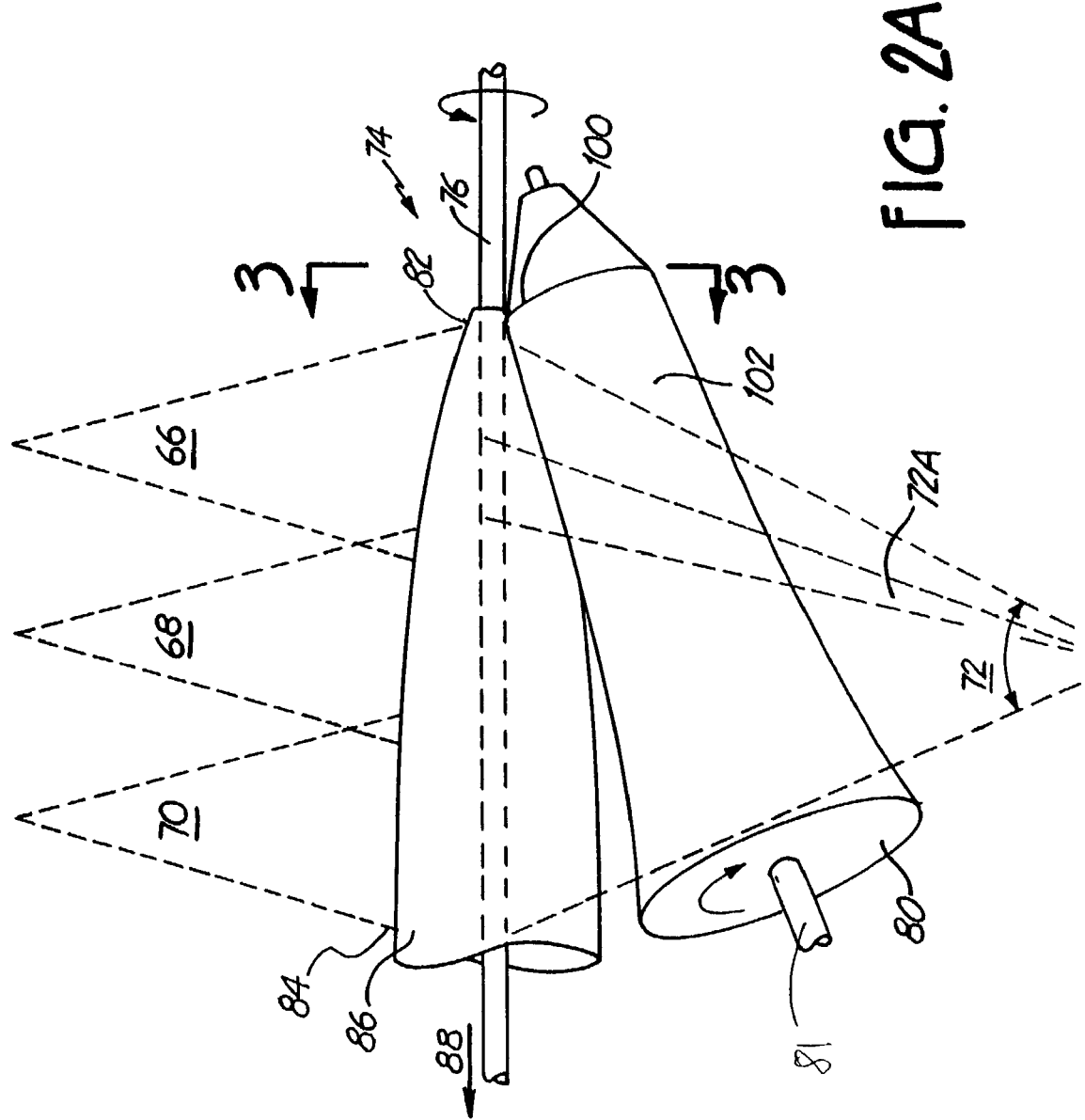
FIG. 2A is an enlarged view of the collection device of the apparatus of FIG. 2.

As more completely shown in FIG. 2A, which is an enlarged view of the collection device of FIG. 2, an accumulated mass of filaments 86 is produced on mandrel 76. Filament pattern 72 comprises reciprocating cone-shaped filament pattern 72A, which sweeps between pattern edges 82 and 84 to produce an overall wider cone-shaped pattern 72. In one embodiment, press roller 80 is oriented at an angle relative to mandrel 76 with nip 100 in contact with mandrel 76. As a non-limiting example, outer surface 102 of press roller 80 is angularly displaced by about 3° relative to mandrel 76. In one embodiment, nip 100 contacts mandrel 76 close to edge 82 of filament pattern 66. Because of the angular placement of press roller 80, compression of filaments in collective filament mass 86 varies along the length of press roller 80. This results in a filament mass having a varying density gradient in the radial dimension, with the filament density of filament pattern 66 being generally greater than that of the filament mass comprised of filament patterns 68 and 70.

Fibers from filament patterns 66, 68, and 70 form a generally two-dimensional mat or layer of material that is continuously formed on mandrel 76 to build up filament mass 86 composed of many layers of fibers. These fibers can be described as being laid down in an X-Y plane, or in the longitudinal and circumferential or latitudinal dimensions. As the fibers are built up, layer upon layer, they produce a radial or depth dimension. The sweeping motion of filament pattern 72A, combined with the rotation of mandrel 76 causes the fibers coming from nozzle 44 to integrate into mass 86 as a "z" direction fiber, extending radially through the zones produced by filament patterns 66, 68, and 70.

Figure 3:
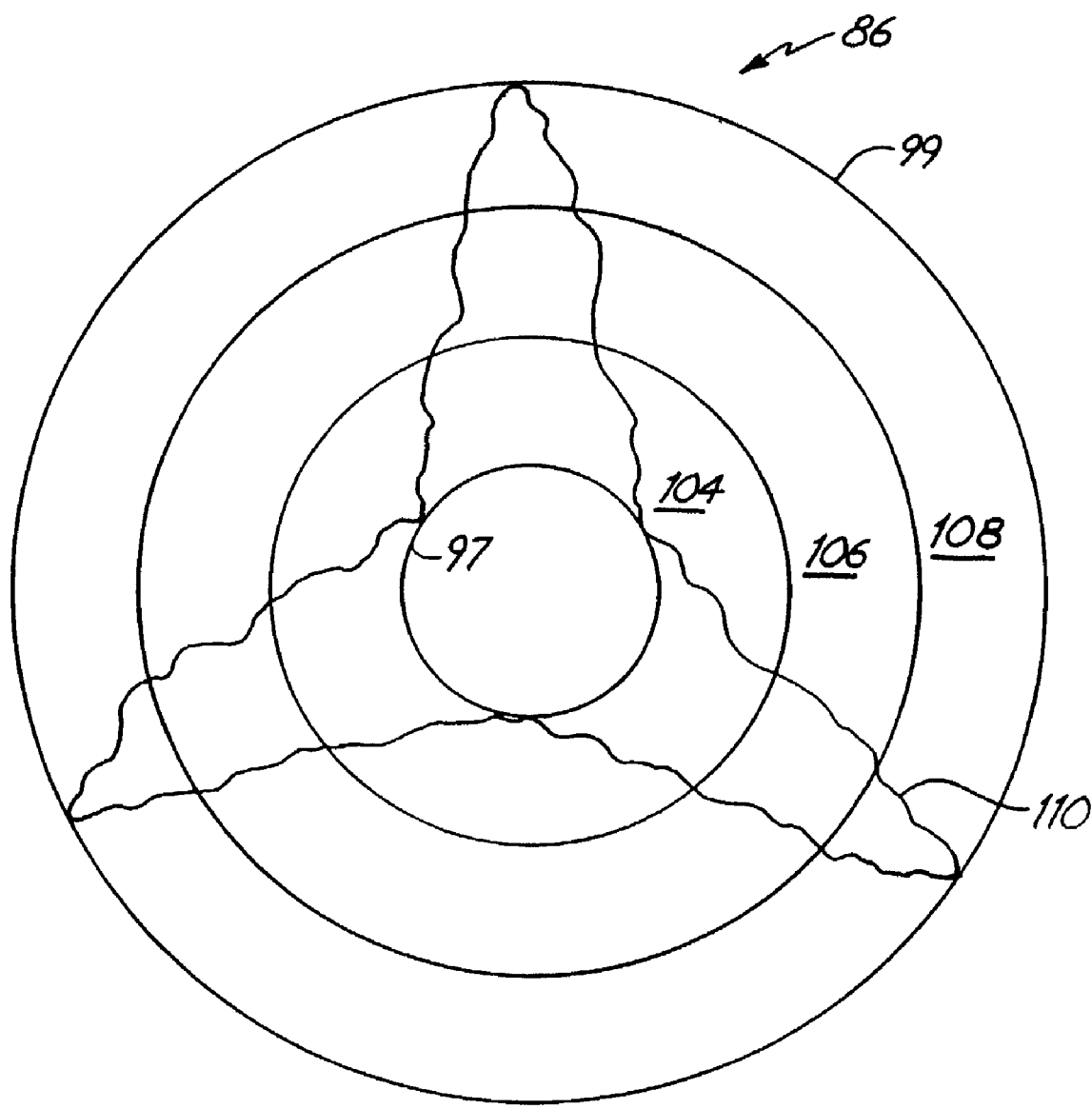
FIG. 3 illustrates an elevation view of a depth filter element of the present invention viewed from line 3—3 of FIG. 2A.

FIG. 3 illustrates an elevation view of filament mass 86 viewed from line 3—3 of FIG. 2A. Filament mass 86 comprises first major surface 97, second major surface 99, and concentric filtration zones 104, 106, and 108, with additional filament mass strength in the radial direction provided by filament 110. Filament 110 serves as a fiber structure strengthening element. Filament 110 extends throughout filament mass 86 and extends in the radial, longitudinal, and circumferential dimensions.

Generally, filament zone 104 is produced by filament pattern 66; filament zone 106 is produced by filament pattern 68; filament zone 108 is produced by filament pattern 70; and filament 110 is produced by filament pattern 72. Filtration zones 104, 106, and 108 preferably possess different physical characteristics. For example, filtration zone 104 may comprise relatively smaller diameter filaments; filtration zone 106 may comprise intermediate diameter filaments; and filtration zone 108 may comprise larger diameter filaments. Filtration zones 104, 106, and 108 preferably have filaments having diameters ranging in size from less than about 1 micron to about 100 microns. Filaments 110 and 172 may have diameters which are equal to, greater than, or less than an average diameter of the filaments of filtration zones 104, 106 and 108. In some embodiments, filtration zone 104 may have a relatively high density of filaments; filtration zone 106 may have an intermediate density of filaments, and filtration zone 108 may have a lower density of filaments. In another embodiment, filtration zones 104, 106 and 108 may have other variations in density.

In one embodiment, there is generally an absence of fiber-to-fiber bonding within each of the masses 104, 106, and 108. The primary bonding within filament mass 86 is accomplished by the bonding between "z" direction fiber 110 and the filaments of zones 104, 106, and 108. Selected zones of the media can be made very rigid to provide a filtering layer which also carries the resultant mechanical loads, thereby eliminating the need for separate structural elements in a given filter device.

FIG. 3. illustrates, for one embodiment, approximately the orientation of "z" fiber 110, as it is laid down during one revolution of mandrel 76 (shown in FIG. 2A). In this embodiment, the relation between the rate of movement of the servo driven sweep of "z" fiber 110 and the rate of rotation of mandrel 76 are such that the "z" fibers 110 are placed in a continuous manner from the core or bottom zone 104 to the shell or top zone 108 and back to the core zone 104 of mass 86 during approximately 120 degrees or less of rotation during the forming of mass 86. The path of "z" fiber 110 in one rotation of mandrel 76 can be described as follows. When filament pattern 72A is near pattern edge 82, "z" fiber 110 is laid onto filament mass 86 near the core of core zone 104. As filament pattern 72A sweeps toward pattern edge 84, "z" fiber 110 is laid across zones 104, 106, and 108 until it reaches the outside of shell zone 108. Mandrel 76 spins while filament pattern 72A sweeps so that "z" fiber 110 also travels in a circumferential direction around filter mass 86. Thus, "z" fiber 110 runs radially, longitudinally, and circumferentially throughout filter mass 86. In the case where mass 86 is planar rather than cylindrical, "z" fiber 110 may be described as extending in the length, width, and thickness dimensions of mass 86.

Filter mass 86 is built up only after many revolutions of mandrel 76, and thus filter mass 86 includes a web of "z" fibers 110 which act to hold together fibers from zones 104, 106, and 108 in all three dimensions, thereby lending strength to filament mass 86 and providing tensile support. Because the fibers of mass 86 are held in place in all three directions, bending moments of the fine fibers are minimized, thereby minimizing dirt release and channeling at increased pressure drops. Such undesirable dirt release and channeling would otherwise be expected when using such fine fibers in a low density media.

In one embodiment, the fibers of zones 104, 106, and 108 comprise about 75–95 percent of the fibers of filter mass 86, and "z" fibers 110 comprise about 5–25 percent of the fibers of filter mass 86; more preferably, the fibers of zones 104, 106, and 108 comprise about 80–90 percent of the fibers of filter mass 86, and "z" fibers 110 comprise about 10–20 percent of the fibers of filter mass 86; most preferably, the fibers of zones 104, 106, and 108 comprise about 85 percent of the fibers of filter mass 86, and "z" fibers 110 comprise about 15 percent of the fibers of filter mass 86. In a preferred embodiment, sweep mechanism 98 is adjustable to control the amount of "z" fiber 110 deposited in each zone 104, 106, and 108. In one embodiment, a higher percentage of "z" fiber 110 is deposited in core zone 104 than in zones 106 and 108. This may be accomplished by slowing the sweep of mechanism 98 in core zone 104. For example, "z" fiber 110 may make up about 25% of the total fibers in core zone 104 and about 3% in shell zone 108. This configuration provides added strength to the core region of filter mass 86, which is required to maintain the filter's crush resistance as it is used.

The fibers of zones 104, 106, and 108 may be comprised of different materials, may be of different sizes, or may otherwise have differing properties. For example, the diameters of the fibers in each zone may get progressively larger from core zone 104 to shell zone 108. Each zone may also possess a different density from each adjacent zone. For example, the density of the zones may decrease progressively from core zone 104 to shell zone 108. Other alternatives will be evident to one skilled in the art.

The unique construction of filament mass 86 allows for a high void volume without sacrificing strength by fixing the fibers into an open, yet supported structure. Thus, the filament mass 86 of the present invention displays significantly greater mechanical strength to weight ratios than media of the prior art. Filament mass 86 may be formed to any thickness desired. In one embodiment, filament mass 86 has an inside diameter of about 1.15 inch and an outside diameter of about 2.5 inches. In one embodiment, filament mass 86 has a mass of about 95 grams or less per ten inch section and a crush strength of at least about 40 psi. A high void volume results in a filament mass 86 with greater dirt holding capacity, longer element life, and lower pressure drop. Moreover, it allows filament mass 86 to be produced faster and with less material, compared with conventional filters. In a preferred embodiment, a ten inch section of filament mass 86 can be produced in about 15 seconds and has a retention rating of 90% at 20 microns.

Figure 4:
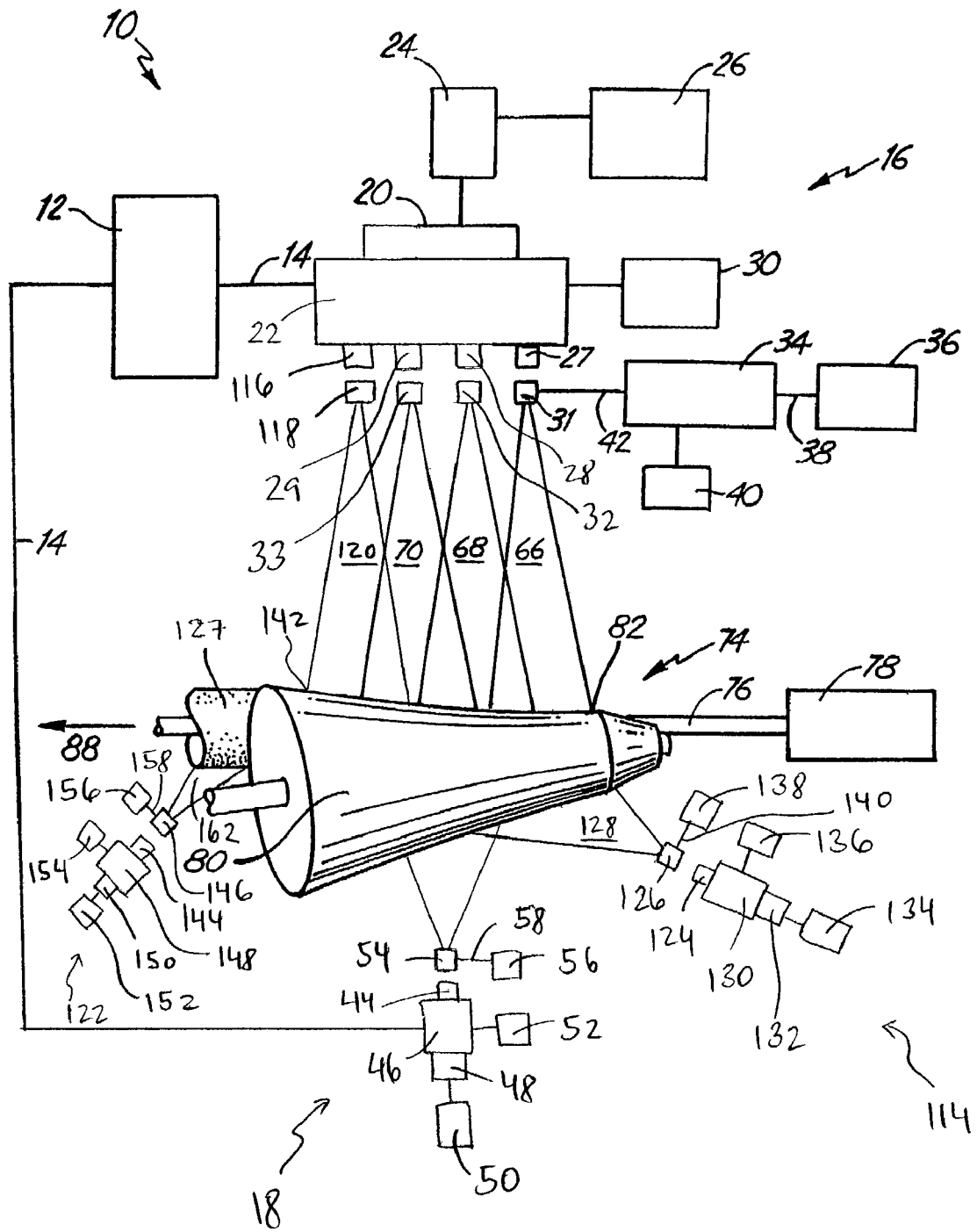
FIG. 4 is a schematic diagram generally illustrating a second embodiment of the system for continuously producing a non-woven depth filter element.

FIG. 4 is a schematic diagram generally illustrating a second embodiment of the system for continuously producing a non-woven depth filter element. FIG. 4 is similar to FIG. 1 but further includes filament delivery system 114, nozzle 116, attenuating mechanism 118, flare pattern 120, and shell-forming filament delivery system 122. Additional nozzle 116, attenuating mechanism 118, and flare pattern 120 are similar to the nozzles 27, 28 and 29; attenuating mechanisms 31, 32, and 33; and flare patterns 66, 68 and 70 described above. While four such nozzles, attenuating mechanisms, and flare patterns are shown for filament delivery system 16, it is contemplated that more or fewer may be used. In one embodiment, nozzles 27, 28, 29 and 116 are positioned about 35 inches to about 40 inches from mandrel 76.

Filament delivery system 114 is substantially similar to that of system 16 described above, except that filament delivery system 114 preferably includes a means of delivering the filaments in such a manner that they intermingle with filaments produced by one or more of the nozzles used in system 16. Filament delivery system 114 may include one or more polymer extrusion nozzles. One embodiment uses one nozzle 124 with attenuator 126, positioned at an acute angle relative to mandrel 76 to deliver a filament pattern or stream 128 which contacts filament mass 127 in an elliptical pattern which intermingles with filament patterns 66, 68, 70 and 120 and those of filament delivery system 18.

Specifically, system 114 includes heater block 130, independently driven positive displacement metering pump 132 and motor 134. Heater block 130 is provided with nozzle 124 and temperature control 136. System 114 is also provided with attenuating mechanism 126 associated with nozzle 124. Pressurized gas is passed to attenuating mechanism 126 from gas supply source 138 via conduit 140. As with delivery system 16, attenuators 126 can be associated with an optional gas heaters, not shown. The provision of separate filament delivery systems 18 and 114 enables separate control and production of polymeric filaments produced by each system 18 and 114, although each of the filament delivery systems 18 and 114 produces filaments which traverse filament mass 127 in a radial, or z, dimension. In one embodiment, the source of material for filament delivery system 114 is extruder 12 via delivery line 14; in another embodiment, the material source for system 114 is separate to provide alternate materials to those used in filament delivery systems 16, 18 and 122.

Delivery system 114 produces a stream of a discrete, essentially continuous polymer filament which is distributed in flared pattern 128 and directed from nozzle 124 and attenuating mechanism 126 toward filament collection device 74. During operation, the filament of stream 128 is directed in a flared pattern toward rotating mandrel 76. In one embodiment, filament pattern 128 spans the distance between a far edge 82 of stream 66 and a far edge 142 of stream 120. In an alternative embodiment, filament pattern 128 does not span the distance between far edges 82 and 142, but does cover a significant portion of the forming layers of filament mass 127, e.g., the distance covered by filament pattern 128 is greater than the distance covered by each primary filament stream 66, 68, 70 and 120 individually. Preferably the distance covered by filament pattern 128 is greater than the distance covered by two or more adjacent primary filament streams 66, 68, 70 and 120. In one embodiment, nozzle 124 is placed about 10–13 inches from mandrel 76. In one embodiment, nozzle 124 is placed at an acute angle of about 10° to about 20° relative to mandrel 76, and more preferably about 15° relative to mandrel 76.

Shell-forming filament delivery system 122 is substantially similar to system 16 described above, except that shell-forming filament delivery system 122 is preferably configured and positioned to produce a relatively smooth outer shell zone 112 (see FIG. 6) on the exterior cylindrical surface of filament mass 127. Shell-forming filament delivery system 122 preferably uses a different location, polymer throughput rate, and air attenuation setting relative to filament delivery system 16. Compared to system 16, nozzle 144 is preferably placed closer to mandrel 76 and uses a lower polymer throughput rate; additionally, attenuating mechanism 146 uses less air attenuation. Similar to system 16, shell-forming filament delivery system 122 includes heater block 148, metering pump 150, motor 152, temperature control 154, gas supply source 156, and conduit 158.

As a non-limiting example, polymer filaments of filament pattern 162 was produced in a depth filter by extruding polypropylene heated to a temperature of between about 270° C. and about 325° C. through nozzle 144 having an orifice size of about 0.016 inch at a rate of about 1 pound per hour and passing an ambient gas at a temperature of about 25° C. at a rate of about 1.5 standard cubic feet per minute over the molten polymer stream exiting the nozzle orifice. In one embodiment, nozzle 144 is placed about 3–6 inches from mandrel 76. It will be appreciated that a person skilled in the art can readily determine other suitable parameter combinations.

Figure 6:
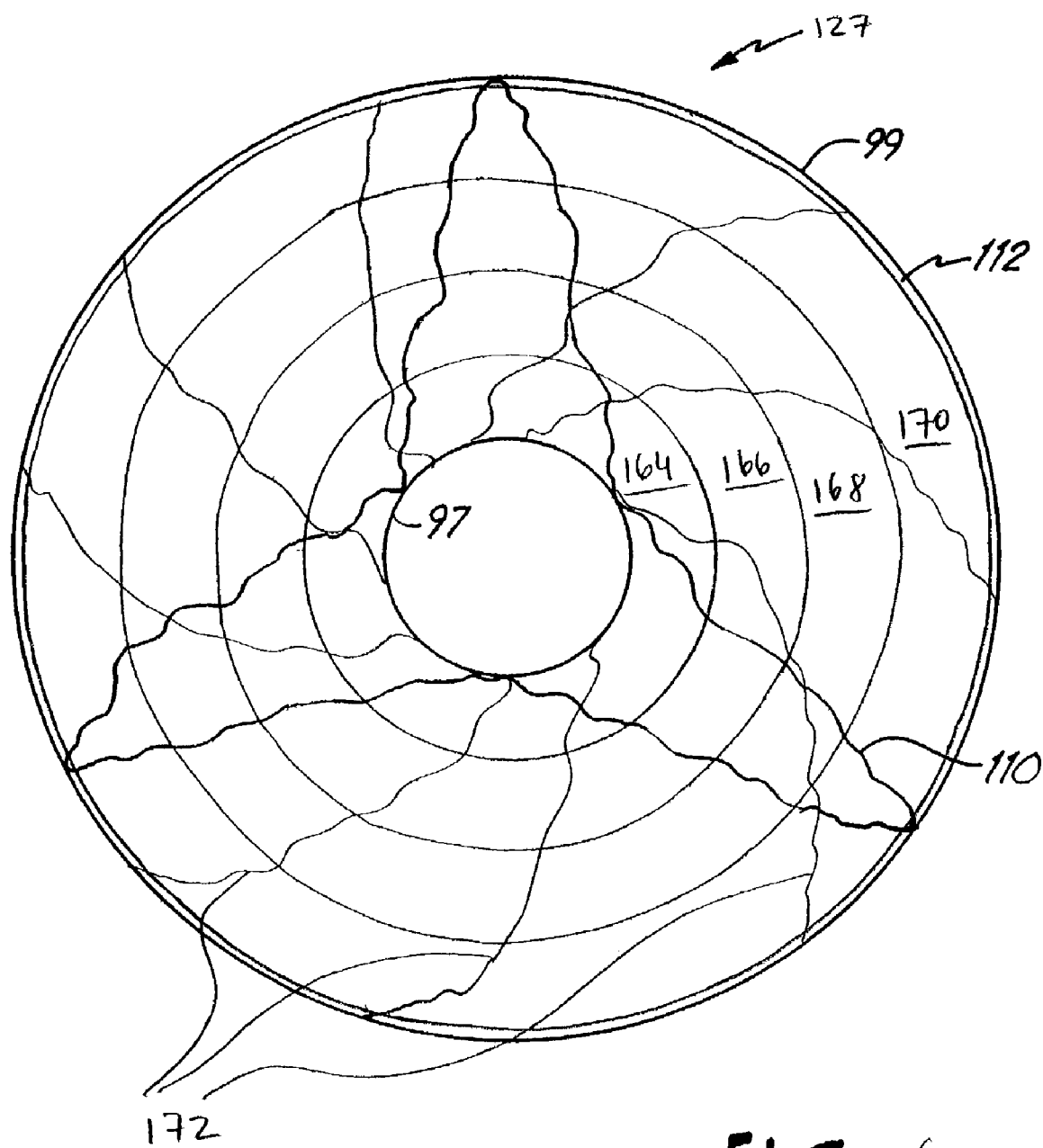
FIG. 6 illustrates an elevation view of a second embodiment of a depth filter element of the present invention viewed from line 6—6 of FIG. 5.

Nozzle 144 is preferably placed so that the filament produced thereby is deposited on the outer zone 170 formed by filament pattern 120 (as shown in FIG. 6). This configuration produces a very shallow zone or shell 112 with significant fiber-to-fiber bonding, including some bonding between the fibers of shell 112 and the fibers of outer zone 170. The fiber-to-fiber bonding of shell 112 essentially eliminates the presence of loose fibers on the surface 99 of the finished filament mass 127 and significantly increases the surface area of the resulting surface 99.

Figure 5:
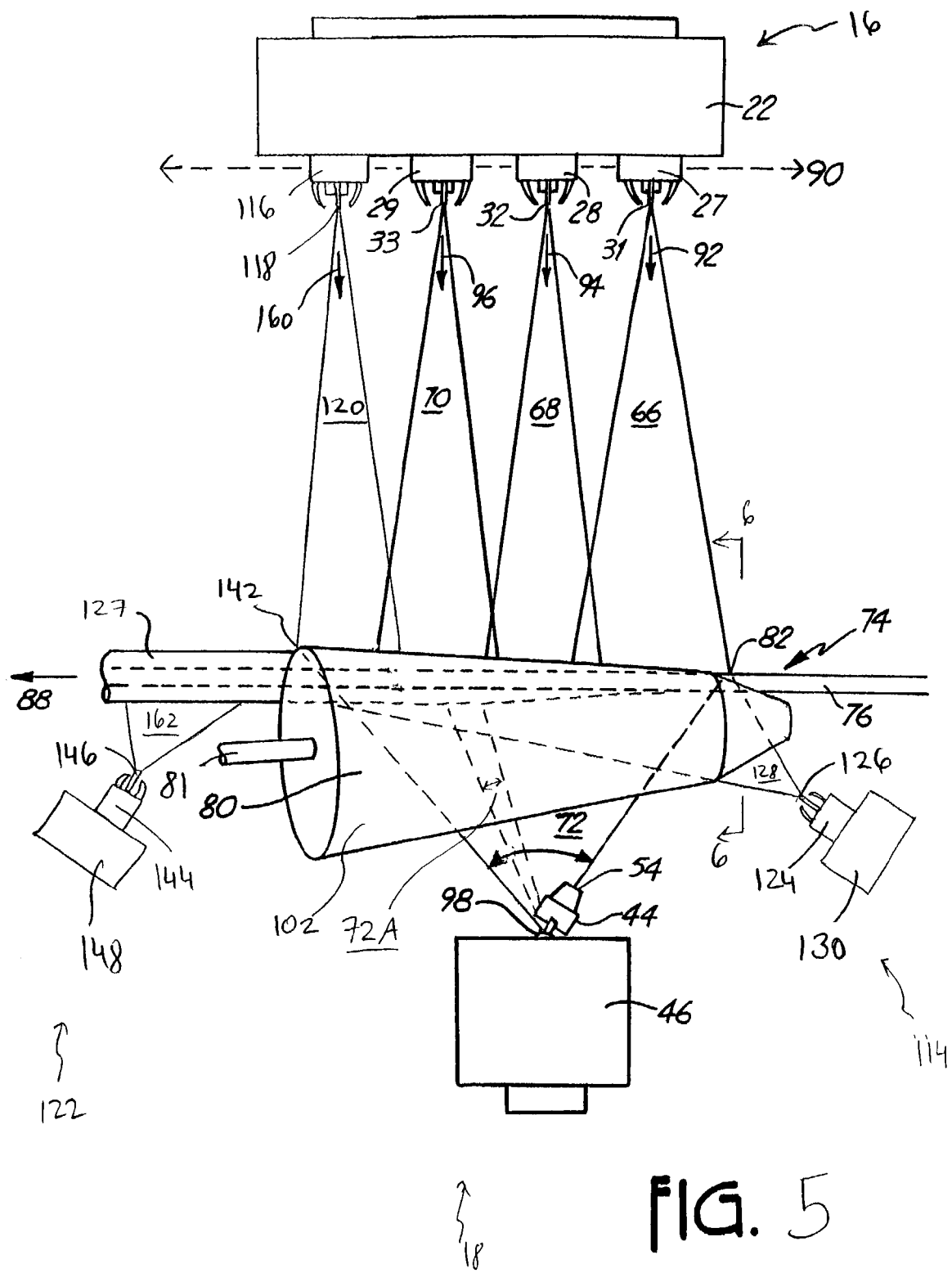
FIG. 5 is a schematic diagram illustrating the system configuration for the embodiment of FIG. 4.

FIG. 5 is a schematic diagram illustrating the system configuration for the embodiment of FIG. 4. As shown in one embodiment in FIG. 5, filament delivery system 16 includes four filament producing devices, each of which comprises a nozzle and an attenuating mechanism, such as nozzles 27, 28, 29 and 116 and attenuating mechanisms 31, 32, 33 and 118. Nozzles 27, 28, 29 and 116 are longitudinally aligned along common axis 90, which is preferably about 0–15 degrees offset from parallel to mandrel 76. In a preferred embodiment, nozzles 27, 28, 29 and 116 are positioned about 4 inches apart. Each nozzle 27, 28, 29 and 116 includes an orifice which defines an axis 92, 94, 96 and 160, respectively, that is preferably perpendicular to axis 90 and about 0–15 degrees offset from perpendicular to mandrel 76. Axes 93, 94, 96 and 160 generally correspond to the flow axis of molten polymer exiting the respective nozzle orifice. In one preferred embodiment, nozzles 27, 28, 29 and 116 are located approximately 40 inches from mandrel 76, which preferably spins at a rate of about 400 RPM. This orientation results in flared filament patterns 66, 68, 70 and 120 being directed toward mandrel 76.

Filament patterns 66, 68, 70 and 120 are comprised of polymer filaments having diameters of between less than about 1 micron to about 100 microns. In a preferred embodiment, filament pattern 66 comprises filaments of the smallest diameter; filament pattern 68 comprises filaments of intermediate diameter; filament pattern 70 comprises filaments of larger diameter; and filament pattern 120 comprises filaments of the largest diameter. As a non-limiting example, polymer filaments of filament patterns 66, 68, 70 and 120 were produced in a depth filter by extruding polypropylene heated to a temperature of between about 325° C. and about 400° C. through a nozzle having an orifice size of about 0.016 inch at a rate of about 11 pounds per hour and passing an ambient gas at a temperature of about 25° C. at a rate of about 13 standard cubic feet per minute over the molten polymer stream exiting the nozzle orifice. It will be appreciated that a person skilled in the art can readily determine other suitable parameter combinations. It can be appreciated that the operating parameters may be varied between filament patterns 66, 68, 70 and 120 to produce zones of varying densities and fiber sizes.

Filament pattern 72 comprises pattern 72A which moves in a reciprocating, transverse pattern, preferably covering the distance between the primary pattern edges 82 and 142. Alternatively, filament pattern 72 covers less than the distance between edges 82 and 142. Attenuating mechanism 54 preferably includes servo driven sweep mechanism 98 which allows attenuating mechanism 54 to sweep through an angle so that the filament pattern 72 traverses back and forth among fiber patterns 66, 68, 70 and 120, along a longitudinal dimension of filament mass 127. As pattern 72A traverses fiber patterns 66, 68, 70 and 120, it deposits essentially continuous polymer filaments across the overall laydown pattern which extends between the primary pattern edges 82 and 142. In formed filament mass 127, the fibers of filament pattern 66 deposited along edge 82 will form a first major surface 97 (shown in FIG. 6), and the fibers of filament pattern 70 deposited along edge 84 will form a second major surface 99 (shown in FIG. 6). In another embodiment, nozzle 44 may be oscillated back and forth to sweep bonding filament pattern 72.

Fibers from filament patterns 66, 68, 70 and 120 form a generally two-dimensional mat or layer of material that is continuously formed on mandrel 76 to build up filament mass 127 composed of many layers of fibers. These fibers can be described as being laid down in an X-Y plane, or in the longitudinal and circumferential or latitudinal dimensions. As the fibers are built up, layer upon layer, they produce a radial or depth dimension. The sweeping motion of filament pattern 72A, combined with the rotation of mandrel 76 causes the fibers coming from nozzle 44 to integrate into mass 127 as a "z" direction fiber, extending radially through the zones produced by filament patterns 66, 68, 70 and 120.

In the embodiment shown in FIG. 5, filament pattern 128 is preferably produced simultaneously by nozzle 124 and attenuating mechanism 126, located about 13 inches from mandrel 76. In one embodiment, nozzle 124 and attenuating mechanism 126 are preferably static or stationary, in that filament pattern 128 does not oscillate or reciprocate like filament pattern 72A. In an alternative embodiment, pattern 128 is oscillated or reciprocated. The filament from pattern 128 preferably mixes with the filament from pattern 72 across filament patterns 66, 68, 70 and 120. This is accomplished in one embodiment by introducing filament pattern or stream 128 at an acute angle relative to mandrel 76, resulting in a highly elliptical cross section of filament pattern 128 contacting the rotating, forming filament mass 127.

As shown in FIG. 5, sweeping filament stream 72A intercepts filament stream 128, helping to secure the filaments of stream 128 to the forming filament mass 127. Further, nozzle 144 and attenuating mechanism 146 preferably direct shell-forming filament pattern 162 onto a portion of filament mass 127 which has substantially reached its finished circumference.

FIG. 6 illustrates an elevation view of a second embodiment of a depth filter element of the present invention viewed from line 6—6 of FIG. 5. Filament mass 127 includes first major surface 97, second major surface 99, and concentric filtration zones 164, 166, 168 and 170, with additional filament mass strength in the radial direction provided by filaments 110 and 172. Filaments 110 and 172 serve as a strengthening element for fiber structure 127. Filaments 110 and 172 extend throughout filament mass 127 and extend in the radial, longitudinal, and circumferential dimensions.

Generally, filament zone 164 is produced by filament pattern 66; filament zone 166 is produced by filament pattern 68; filament zone 168 is produced by filament pattern 70; filament zone 170 is produced by filament pattern 120; filament 110 is produced by filament pattern 72; and filament 172 is produced by filament pattern 128. Filtration zones 164, 166, 168 and 170 preferably possess different physical characteristics. For example, filtration zone 164 may comprise relatively smaller diameter filaments; filtration zones 166 and 168 may comprise intermediate diameter filaments; and filtration zone 170 may comprise larger diameter filaments. Filtration zones 164, 166, 168 and 170 preferably have filaments having diameters ranging in size from less than about 1 micron to about 100 microns. In another embodiment, for example, filtration zone 164 may have a relatively high density of filaments; filtration zones 166 and 168 may have an intermediate density of filaments, and filtration zone 170 may have a lower density of filaments.

In one embodiment, there is generally an absence of fiber-to-fiber bonding within each of the masses 164, 166, 168 and 170 produced by filament patterns 66, 68, 60 and 120, respectively. The primary bonding within filament mass 127 is accomplished by the bonding between "z" direction fibers 110 and 172 and the filaments of zones 164, 166, 168 and 170. Selected zones of the media can be made very rigid to provide a filtering layer which also carries the resultant mechanical loads, thereby eliminating the need for separate structural elements in a given filter device.

Fibers 110 are produced as described with reference to FIG. 3 above. Fibers 172 are formed as follows: when the filament stream of filament pattern 128 is near pattern edge 82, "z" fiber 172 is laid onto filament mass 127 near the area of surface 97. As the filament stream of filament pattern 128 flares toward pattern edge 142, "z" fiber 172 is laid across zones 164, 166, 168 and 170 until it reaches the outside of outer zone 170. Mandrel 76 spins while filament pattern 128 sprays so that "z" fiber 172 also travels in a circumferential direction around filter mass 127. Thus, "z" fiber 172 runs radially, longitudinally, and circumferentially throughout filter mass 127. In the case where mass 127 is planar rather than cylindrical, gluing fiber 172 may be described as extending in the length, width, and thickness dimensions of mass 127.

In a preferred embodiment, filament pattern 128 is positioned so that the elliptical cross sectional area that contacts fiber mass 127 transverses one or more zones 164, 166, 168 and 170; however, filament pattern 128 need not transverse all zones 164, 166, 168 and 170. The elliptical cross section of filament pattern 128 results in a longitudinal component of orientation. The forming fiber mass 127 upon which filament stream 128 is laid has a conical shape resulting in a radial component of orientation. Mandrel 26 spins, providing filament 172 with a circumferential component of orientation around filter mass 127. Thus, "z" fiber 172 runs radially, longitudinally and circumferentially throughout filter mass 127. While one nozzle 124 is shown to produce filaments 172, it is contemplated that a different number of nozzles with other positions and configurations may also be used.

In one embodiment, the fibers of zones 164, 166, 168 and 170 comprise about 75–95 percent of the fibers of filter mass 127, and "z" fibers 110 and 172 comprise about 5–25 percent of the fibers of filter mass 127; more preferably, the fibers of zones 164, 166, 168 and 170 comprise about 80–90 percent of the fibers of filter mass 127, and "z" fibers 110 and 172 comprise about 10–20 percent of the fibers of filter mass 127; most preferably, the fibers of zones 164, 166, 168 and 170 comprise about 85 percent of the fibers of filter mass 127, and "z" fibers 110 and 172 comprise about 15 percent of the fibers of filter mass 127.

A new and unexpected property of the media of the present invention is that a strong integral filtration core may be produced without significantly increasing the density of the media. This is accomplished by depositing bonding fibers 110 and 172 onto the primary filtration fibers of zones 164, 166, 168 and 170 during the melt blowing process. The additional heat energy of bonding fibers 110 and 172 allow the highly amorphous polypropylene primary filtration fibers to significantly increase in crystallinity, which, in turn, strengthens the media.

The fibers of zones 164, 166, 168 and 170 may be comprised of different materials, may be of different sizes, or may otherwise have differing properties. For example, the diameters of the fibers in each zone may get progressively larger from core zone 164 to outer zone 170. Each zone may also possess a different density from each adjacent zone. For example, the density of the zones may decrease progressively from core zone 164 to outer zone 170. Moreover, in one embodiment, one or both of "z" fibers 110 and 172 have different material properties than the primary fibers of zones 162, 166, 168 and 170. For example, fibers 110 and/or 172 may be catalysts for reactions or absorbent or adsorbent materials for toxins, viruses, proteins, organics, or heavy metals. In a preferred embodiment, the diameters of structural strengthening fibers or filaments 110 and 172 are comparable to the diameters of the primary filtration fibers in zones 164, 166, 168 and 170 so that the fibers 110 and 172 contribute not only to the strength of filament mass 127, but also to its filtration capabilities. Other alternatives will be evident to one skilled in the art.

Depth filter elements formed in the manner described herein have demonstrated excellent particle filtration and fluid throughput capabilities. For example, the depth filter of the present invention has been demonstrated to have about twice the life and dirt holding capacity compared to similarly rated filters (e.g., 90% effective at removing 20 micron particles). Furthermore, the depth filter element of the present invention allows fluid throughput with a minimal drop in fluid pressure across the filter.

Filter performance depends on a combination of a number of factors, including the following: the size of contaminants that the filter can remove (efficiency), the amount of contaminants the filter can hold before plugging (dirt holding capacity), and the reliability of the filter function throughout its life or under variable operating conditions.

For any given filter, the dirt holding capacity (DHC) and filter efficiency are generally inversely related. The mass of a particle varies with the cube of its radius; therefore, lower efficiency filters that trap only larger particles and let the smaller particles pass can gain more weight before plugging.

To one skilled in the art, it is evident that DHC and filter cartridge weight are also generally inversely related. Reducing the weight of a fixed-volume filter cartridge is accomplished by taking material out of the cartridge, which in turn leaves more space (void volume) in which the trapped contaminants may accumulate. It is also apparent that taking material out of the cartridge, with all other variables held constant, makes the cartridge weaker (lower filter crush strength).

Filter crush strength is a typical measurement used to gauge the durability of a filter cartridge. If a filter is too soft, it will not function reliably throughout its service life or under variable operating conditions. To one skilled in the art of melt blowing, it is apparent that filter crush strength at a fixed filter weight can be manipulated by changing the fiber diameter as well as other process parameters; generally, larger fibers produce higher crush strength. Changing the filter construction to larger fibers generally increases the pore size to some degree, resulting in lower retention efficiency.

In order to take these major filter performance and construction variables into consideration for the purpose of filter comparison, the Madsen performance ratio (M) has been developed.

$$M_{ratio} = (DHC \times \text{crush strength})/(\mu m @ 90\% \times \text{filter weight})$$

DHC is in grams crush strength is in pounds per square inch (psi)

$\mu m @ 90\%$ refers to the particle size ($\mu m$) at which the filter produces 90% efficiency filter weight (unused filter) is in grams Higher ratio values indicate better utilization of the material in the filter, meaning that the filter has a better balance of strength, dirt holding capacity, and removal efficiency than filter with lower ratio values.

Although the description of the preferred embodiments and methods have been quite specific, it is contemplated that various modifications could be made without deviating from the spirit of the present invention. Accordingly, it is intended that the scope of the present invention be dictated by the appended claims rather than by the description of the illustrated embodiments. For example, it is contemplated that the teachings of the present invention may be adapted for flat or sheet type filters and products of other configurations. Additionally, the invention may also be practiced using "z" fibers 172 without "z" fibers 110, or vice versa. One advantage of the use of both "z" filament delivery systems 18 and 114 is that a system of multiple sources offers an operator a greater degree of control. Additionally, while one filament delivery system of each type 16, 18, 114 and 122 is shown, it is contemplated that multiple systems of one or more types may also be used.

Moreover, it is contemplated that the roles of the filaments from the various delivery systems may be interchanged. For example, in one embodiment, the primary filtration filaments are produced by system 16 and bonding or structural strengthening filaments are produced by systems 18 and 114. In another embodiment, the primary filtration filaments are produced by one or both of systems 18 and 114, and bonding or structural strengthening filaments are produced by system 16. The operating parameters and conditions can be manipulated by one of ordinary skill to obtain the desired combination of filaments in a mass.

EXAMPLE 1

Comparing a filter of the present invention with a standard filter, the following results were found for filters for a 10 micron particle size (A.C. fine test dust):

| product | crush strength (psi) | weight of 10" cartridge (g) | life (minutes) | dirt holding capacity (g) |
|---|---|---|---|---|
| invention | 93 | 133 | 60 | 60 |
| standard | 125 | 205 | 29 | 33 |
| control | 42 | 143 | | |

In all three examples, the standard product is made by any of the prior art methods discussed in the background of the invention. The control product is made by the same method as the invention, but without the z filaments 110 and 172. This is accomplished by turning off the material pumps to nozzles 44 and 124. Additionally, the control filter cartridge was allowed more time to form in order to compensate for the decreased input of material and allow it to reach a comparable weight compared to the invention product using z filaments 110 and 172. Other operating conditions for formation of the "invention" and the "control" cylindrical cartridges are described below.

In this example, the filter of the present invention was much lighter than the standard filter, lasted about twice as long, and had about twice the DHC of the standard filter. However, it had a lower crush strength. Applying the formula above, $M_{ratio-invention} = 4.2$ and $M_{ratio-standard} = 2.0$. Thus, the filter of the present invention performs better than the standard product. The control product was tested only for crush strength. At a weight comparable to the invention product, the control product exhibited less than half the crush strength of the invention product.

In this example, the filter of the present invention was produced using primary fiber filament patterns 66, 68, 70 and 120 created by extruding polypropylene heated to between about 360° C. and about 400° C. through nozzles 27, 28, 29 and 116 having an orifice size of about 0.016 inch at a rate of about 9.5 pounds per hour. Filament streams 66 and 68 were heated to about 400° C., and filament streams 70 and 120 were heated to about 360° C. Attenuating mechanisms 31, 32, 33 and 118 passed ambient gas at a temperature of about 25° C. and had flow rates between about 10.5 to about 15 cubic feet per minute over the molten polymer streams exiting from nozzles 27, 28, 29 and 116. The flow rate of attenuating mechanism 31 was at about 15 cubic feet per minute over nozzle 27 and the flow rates of attenuating mechanisms 32, 33 and 118 progressively decreased to a flow rate of about 10.5 cubic feet per minute at attenuating mechanism 118 over nozzle 116. Nozzles 27, 28, 29 and 116 were positioned at a distance of between about 35 and about 37 inches from mandrel 76.

"Z" fiber filament pattern 128 was produced by extruding polypropylene heated to about 370° C. through nozzle 124 having an orifice size of about 0.016 inch at a rate of about 5.5 pounds per hour. Attenuating mechanism 126 passed ambient gas at a temperature of about 25° C. and had a flow rate of about 9 cubic feet per minute over the polymer stream exiting nozzle 124. Nozzle 124 was positioned at a distance about 13 inches from mandrel 76.

"Z" fiber filament pattern 72A was produced by extruding polypropylene heated to about 370° C. through nozzle 44 having an orifice size of about 0.016 inch at a rate of about 5.5 pounds per hour. Attenuating mechanism 54 passed ambient gas at a temperature of about 250° C. and had a flow rate of about 7 cubic feet per minute over the polymer stream exiting nozzle 44. Nozzle 44 was positioned at a distance about 21 inches from mandrel 76.

Shell forming fiber filament pattern 162 was produced by extruding polypropylene heated to about 280° C. through nozzle 144 having an orifice size of about 0.016 inch at a rate of about 1.0 pound per hour. Attenuating mechanism 146 passed ambient gas at a temperature of about 25° C. and had a flow rate of about 1.25 cubic feet per minute over the polymer stream exiting nozzle 144. Nozzle 144 was positioned at a distance about 3.5 inches from mandrel 76.

EXAMPLE 2

Comparing a filter of the present invention with a standard filter, the following results were found for filters for a 20 micron particle size (A.C. coarse test dust):

| product | crush strength (psi) | weight of 10" cartridge (g) | life (minutes) | dirt holding capacity (g) |
|---|---|---|---|---|
| invention | 83 | 119 | 85 | 118 |
| standard | 100 | 160 | 46 | 65 |
| control | 36 | 129 | | |

In this example, the filter of the present invention was lighter than the standard filter, lasted about twice as long, and had almost twice the DHC of the standard filter. However, it had a lower crush strength. Applying the formula above, $M_{ratio-invention}$ =4.1 and $M_{ratio-standard}$=2.0. Thus, the filter of the present invention performs better than the standard product. The control product was tested only for crush strength. At a weight comparable to the invention product, the control product exhibited less than half the crush strength of the invention product.

In this example, the filter of the present invention was produced using primary fiber filament patterns 66, 68, 70 and 120 created by extruding polypropylene heated to about 370° C. through nozzles 27, 28, 29 and 116 having an orifice size of about 0.016 inch at a rate of between about 10 to about 11 pounds per hour. Nozzles 27 and 28 had a flow rate of about 10 pounds per hour and nozzles 29 and 116 had greater flow rates of approximately 11 pounds per hour. Attenuating mechanisms 31, 32, 33 and 118 passed ambient gas at a temperature of about 25° C. and had flow rates between about 10.5 to about 15 cubic feet per minute over the molten polymer streams exiting from nozzles 27, 28, 29 and 116. The flow rate of attenuating mechanism 31 was at about 15 cubic feet per minute over nozzle 27 and the flow rates of attenuating mechanisms 32, 33 and 118 progressively decreased to a flow rate of about 10.5 cubic feet per minute at attenuating mechanism 118 over nozzle 116. Nozzles 27, 28, 29 and 116 were positioned at a distance of between about 38 and about 40 inches from mandrel 76.

"Z" fiber filament pattern 128 was produced by extruding polypropylene heated to about 370° C. through nozzle 124 having an orifice size of about 0.016 inch at a rate of about 6 pounds per hour. Attenuating mechanism 126 passed ambient gas at a temperature of about 25° C. and had a flow rate of about 12 cubic feet per minute over polymer stream exiting nozzle 124. Nozzle 124 was positioned at a distance about 13 inches from mandrel 76.

"Z" fiber filament pattern 72A was produced by extruding polypropylene heated to about 370° C. through nozzle 44 having an orifice size of about 0.016 inch at a rate of about 6 pounds per hour. Attenuating mechanism 54 passed ambient gas at a temperature of about 25° C. and had a flow rate of about 11 cubic feet per minute over the polymer stream exiting nozzle 44. Nozzle 44 was positioned at a distance about 22 inches from mandrel 76.

Shell forming fiber filament pattern 162 was produced by extruding polypropylene heated to about 290° C. through nozzle 144 having an orifice size of about 0.016 inch at a rate of about 1.1 pound per hour. Attenuating mechanism 146 passed ambient gas at a temperature of about 25° C. and had a flow rate of about 1.75 cubic feet per minute over the polymer stream exiting nozzle 144. Nozzle 144 was positioned at a distance about 3.5 inches from mandrel 76.

EXAMPLE 3

Comparing a filter of the present invention with a standard filter, the following results were found for filters for a 30 micron particle size (A.C. coarse test dust):

| product | crush strength (psi) | weight of 10" cartridge (g) | life (minutes) | dirt holding capacity (g) |
|---|---|---|---|---|
| invention | 75 | 113 | 105 | 120 |
| standard | 80 | 152 | 50 | 73 |
| control | 43 | 106 | | |

In this example, the filter of the present invention was lighter than the standard filter, lasted about twice as long, had a much greater DHC, and had a comparable crush strength. Applying the formula above, $M_{ratio-invention}$=2.7 and $M_{ratio-standard}$ =1.3. Thus, the filter of the present invention performs better than the standard product. The control product was tested only for crush strength. At a weight comparable to the invention product, the control product exhibited significantly lower crush strength compared to the invention product.

In this example, the filter of the present invention was produced using primary fiber filament patterns 66, 68, 70 and 120 created by extruding polypropylene heated to about 360° C. through nozzles 27, 28, 29 and 116 having an orifice size of about 0.016 inch at a rate of between about 10 to about 11 pounds per hour. Nozzles 27 and 28 had a flow rate of about 10 pounds per hour and nozzles 29 and 116 had greater flow rates of about 11 pounds per hour. Attenuating mechanisms 31, 32, 33 and 118 passed ambient gas at a temperature of about 25° C. and had flow rates between about 10.5 to about 15 cubic feet per minute over the molten polymer streams exiting from nozzles 27, 28, 29 and 116. The flow rate of attenuating mechanism 31 was at about 15 cubic feet per minute over nozzle 27 and the flow rates of attenuating mechanisms 32, 33 and 118 progressively decreased to a flow rate of about 10.5 cubic feet per minute at attenuating mechanism 118 over nozzle 116. Nozzles 27, 28, 29 and 116 were positioned at a distance of between about 38 and about 40 inches from mandrel 76.

"Z" fiber filament pattern 128 was produced by extruding polypropylene heated to about 360° C. through nozzle 124 having an orifice size of about 0.016 inch at a rate of about 6 pounds per hour. Attenuating mechanism 126 passed ambient gas at a temperature of about 25° C. and had a flow rate of about 12 cubic feet per minute over the polymer stream exiting nozzle 124. Nozzle 124 was positioned at a distance about 13 inches from mandrel 76.

"Z" fiber filament pattern 72A was produced by extruding polypropylene heated to about 360° C. through nozzle 44 having an orifice size of about 0.016 inch at a rate of about 6 pounds per hour. Attenuating mechanism 54 passed ambient gas at a temperature of about 25° C. and had a flow rate of about 11 cubic feet per minute over the polymer stream exiting nozzle 44. Nozzle 44 was positioned at a distance about 22 inches from mandrel 76.

Shell forming fiber filament pattern 162 was produced by extruding polypropylene heated to about 280° C. through nozzle 144 having an orifice size of about 0.016 inch at a rate of about 1.1 pound per hour. Attenuating mechanism 146 passed ambient gas at a temperature of about 25° C. and had a flow rate of about 1.75 cubic feet per minute over the polymer stream exiting nozzle 144. Nozzle 144 was positioned at a distance about 3.5 inches from mandrel 76.

What is claimed is:

1. A non-woven melt-blown filament medium, the filament medium comprising:
   a mass of melt-blown polymer filaments, the mass having a depth dimension, a longitudinal dimension, and a latitudinal dimension; the filaments of the mass being generally oriented in the longitudinal and latitudinal dimensions, the mass comprising a plurality of zones in the depth dimension having different characteristics; and
   a traversing melt-blown polymer filament generally oriented to extend through the longitudinal, latitudinal and depth dimensions of the mass, so that the traversing filament extends in the depth dimension through two or more zones.

2. The filament medium of claim 1 in which the filaments of the mass have an average diameter, and in which the traversing filament has a diameter about equal to the average diameter of the filaments of the mass.

3. The filament medium of claim 1 in which the filaments of the mass have an average diameter, and in which the traversing filament has a diameter greater than the average diameter of the filaments of the mass.

4. The filament medium of claim 1 in which the filaments of the mass have an average diameter, and in which the traversing filament has a diameter less than the average diameter of the filaments of the mass.

5. The filament medium of claim 1 in which each zone comprising comprises filaments of different size than each adjacent zone.

6. The filament medium of claim 1 in which a ratio of an amount of traversing filament to an amount of all the filaments of a zone is different in each zone compared to each adjacent zone.

7. The filament medium of claim 1 in which each zone has a different density than each adjacent zone.

8. The filament medium of claim 5 in which the mass comprises:
   a first zone of polymer filaments;
   a second zone adjacent the first zone, the second zone comprising polymer filaments generally having larger diameters than the filaments of the first zone; and
   a third zone adjacent the second zone, the third zone comprising polymer filaments generally having larger diameters than the filaments of the second zone.

9. The filament medium of claim 8 in which a ratio of an amount of traversing filament to an amount of all the filaments of a zone is higher in the first zone than in the third zone.

10. The filament medium of claim 1 in which the mass is cylindrical and comprises a plurality of concentric zones, each zone having a different density than each adjacent zone.

11. The filament medium of claim 10 in which the cylindrical mass comprises:
    a core zone of polymer filaments;
    an intermediate zone of polymer filaments surrounding the core zone, the intermediate zone being generally less dense than the core zone; and
    an outer zone of polymer filaments surrounding the intermediate zone, the outer zone being generally less dense than the intermediate zone.

12. The filament medium of claim 1 wherein the polymer filaments of the layers of the mass exhibit minimal filament to filament bonding.

13. The filament medium of claim 1 in which the traversing filament bonds together the filaments of the mass through which it extends.

14. The filament medium of claim 1 in which the traversing filament structurally interlocks the filaments of the mass through which it extends.

15. The filament medium of claim 1 in which the traversing filament crystallizes the filaments of the mass through which it extends.

16. The filament medium of claim 1 in which the traversing filament is made of a different polymer than the filaments of the mass.

17. The filament medium of claim 16 in which the traversing filament comprises an adsorbent material.

18. The filament medium of claim 16 in which the traversing filament comprises an absorbent material.

19. The filament medium of claim 16 in which the traversing filament comprises a catalyst.

20. A non-woven melt-blown filament medium, the filament medium comprising:
    a mass of essentially continuous melt-blown polymer filaments, the mass having a depth dimension, a longitudinal dimension, and a latitudinal dimension; the filaments of the mass comprising a plurality of layers, each of the plurality of layers being generally oriented in the longitudinal and latitudinal dimensions, the mass compring a plurality of zones in the depth dimension having different characteristics; and
    an essentially continuous traversing melt-blown polymer filament generally oriented to extend in the longitudinal, latitudinal and depth dimensions of the mass and extending in the depth dimension through the plurality of zones.

21. The filament medium of claim 20 in which the filaments of the mass have an average diameter, and in which the traversing filament has a diameter about equal to the average diameter of the filaments of the mass.

22. The filament medium of claim 20 in which the filaments of the mass have an average diameter, and in which the traversing filament has a diameter greater than the average diameter of the filaments of the mass.

23. The filament medium of claim 20 in which the filaments of the mass have an average diameter, and in which the traversing filament has a diameter less than the average diameter of the filaments of the mass.

24. The filament medium of claim 20 in which each zone comprises filaments of different size than each adjacent zone.

25. The filament medium of claim 20 in which a ratio of an amount of traversing filament to an amount of all the filaments of a zone is different in each zone compared to each adjacent zone.

26. The filament medium of claim 20 in which each zone has a different density than each adjacent zone.

27. The filament medium of claim 24 in which the mass comprises:
a first zone of essentially continuous polymer filaments;
a second zone adjacent the first zone, the second zone comprising essentially continuous polymer filaments generally having larger diameters than the filaments of the first zone; and
a third zone adjacent the second zone, the third zone comprising essentially continuous polymer filaments generally having larger diameters than the filaments of the second zone.

28. The filament medium of claim 27 in which a ratio of an amount of traversing filament to an amount of all the filaments of a zone is higher in the first zone than in the third zone.

29. The filament medium of claim 20 in which the mass is cylindrical and comprises a plurality of concentric zones, each zone having a different density than each adjacent zone.

30. The filament medium of claim 29 in which the cylindrical mass comprises:
a core zone of essentially continuous polymer filaments;
an intermediate zone of essentially continuous polymer filaments surrounding the core zone, the intermediate zone being generally less dense than the core zone; and
an outer zone of essentially continuous polymer filaments surrounding the intermediate zone, the outer zone being generally less dense than the intermediate zone.

31. The filament medium of claim 20 wherein the essentially continuous polymer filaments of the layers of the mass exhibit minimal filament to filament bonding.

32. The filament medium of claim 20 in which the traversing filament bonds together the layers through which it extends.

33. The filament medium of claim 20 in which the traversing filament structurally interlocks the layers through which it extends.

34. The filament medium of claim 20 in which the traversing filament crystallizes the filaments of the layers through which it extends.

35. The filament medium of claim 20 in which the traversing filament is made of a different polymer than the filaments of the mass.

36. The filament medium of claim 35 in which the traversing filament comprises an adsorbent material.

37. The filament medium of claim 35 in which the traversing filament comprises an absorbent material.

38. The filament medium of claim 35 in which the traversing filament comprises a catalyst.

39. A three-dimensional non-woven melt-blown polymeric fiber structure having first and second major surfaces, the structure comprising:
a plurality of layers of essentially continuous melt-blown polymer fibers forming a plurality of zones in a depth dimension having different characteristics between the first and second major surfaces; and
a melt-blown fiber structural strengthening element that traverses a plurality of the layers between the first and second major surfaces and engages fibers of the layers, the melt-blown fiber structural strengthening element being generally oriented to extend through longitudinal, latitudinal and depth dimensions of the plurality of layers so that it extends in the depth dimension from the first major surface to the second major surface through the plurality of zones.

40. The fiber structure of claim 39 n which the fibers of the plurality of layers have an average diameter, and in which the fiber structural strengthening element has a diameter about equal to the average diameter of the fibers of the plurality of layers.

41. The fiber structure of claim 39 in which the fibers of the plurality of layers have an average diameter, and in which the fiber structural strengthening element has a diameter greater than the average diameter of the fibers of the plurality of layers.

42. The fiber structure of claim 39 in which the fibers of the plurality of layers have an average diameter, and in which the fiber structural strengthening element has a diameter less than the average diameter of the fibers of the plurality of layers.

43. The fiber structure of claim 39 further comprising a density gradient across the plurality of layers.

44. The fiber structure of claim 43 in which the plurality of zones comprise:
a lower zone of layers adjacent the first major surface; and
an upper zone of layers adjacent the second major surface, the upper zone comprising essentially continuous polymer fibers generally having larger diameters than the fibers of the lower zoned.

45. The fiber structure of claim 44 further comprising:
an intermediate zone between the lower zone and the upper zone, the intermediate zone comprising essentially continuous polymer fibers having diameters generally larger than diameters of fibers of the lower zone and generally smaller than diameters of fibers of the upper zone.

46. The fiber structure of claim 44 in which a ratio of an amount of fiber structure strengthening element to an amount of all the fibers of a zone of layers is higher in the lower zone than in the upper zone.

47. The fiber structure of claim 39 wherein the fiber structural strengthening element is made from a different polymer than the fibers of the plurality of layers.

48. The fiber structure of claim 47 in which the fiber structural strengthening element comprises an adsorbent material.

49. The fiber structure of claim 47 in which the fiber structural strengthening element comprises an absorbent material.

50. The fiber structure of claim 39 in which the fiber structural strengthening element comprises a catalyst.

51. The fiber structure of claim 39 in which the structure is cylindrical and comprises a plurality of concentric zones, each zone having a different density than each adjacent zone.

52. The fiber structure of claim 51 in which the cylindrical structure comprises:
   a core zone of essentially continuous polymer filaments;
   an intermediate zone of essentially continuous polymer filaments surrounding the core zone, the intermediate zone being generally less dense than the core zone; and
   an outer zone of essentially continuous polymer filaments surrounding the intermediate zone, the outer zone being generally less dense than the intermediate zone.

53. The fiber structure of claim 39 in which the fiber structural strengthening element bonds the plurality of the layers together.

54. The fiber structure of claim 39 in which the fiber structural strengthening element interlocks the plurality of the layers.

55. The fiber structure of claim 39 in which the fiber structural strengthening element crystallizes the fibers of the plurality of the layers.

* * * * *